Jan. 31, 1933.  S. P. MILLER  1,895,676
COAL DISTILLATION BY-PRODUCT RECOVERY SYSTEM
Filed June 18, 1929  3 Sheets-Sheet 2
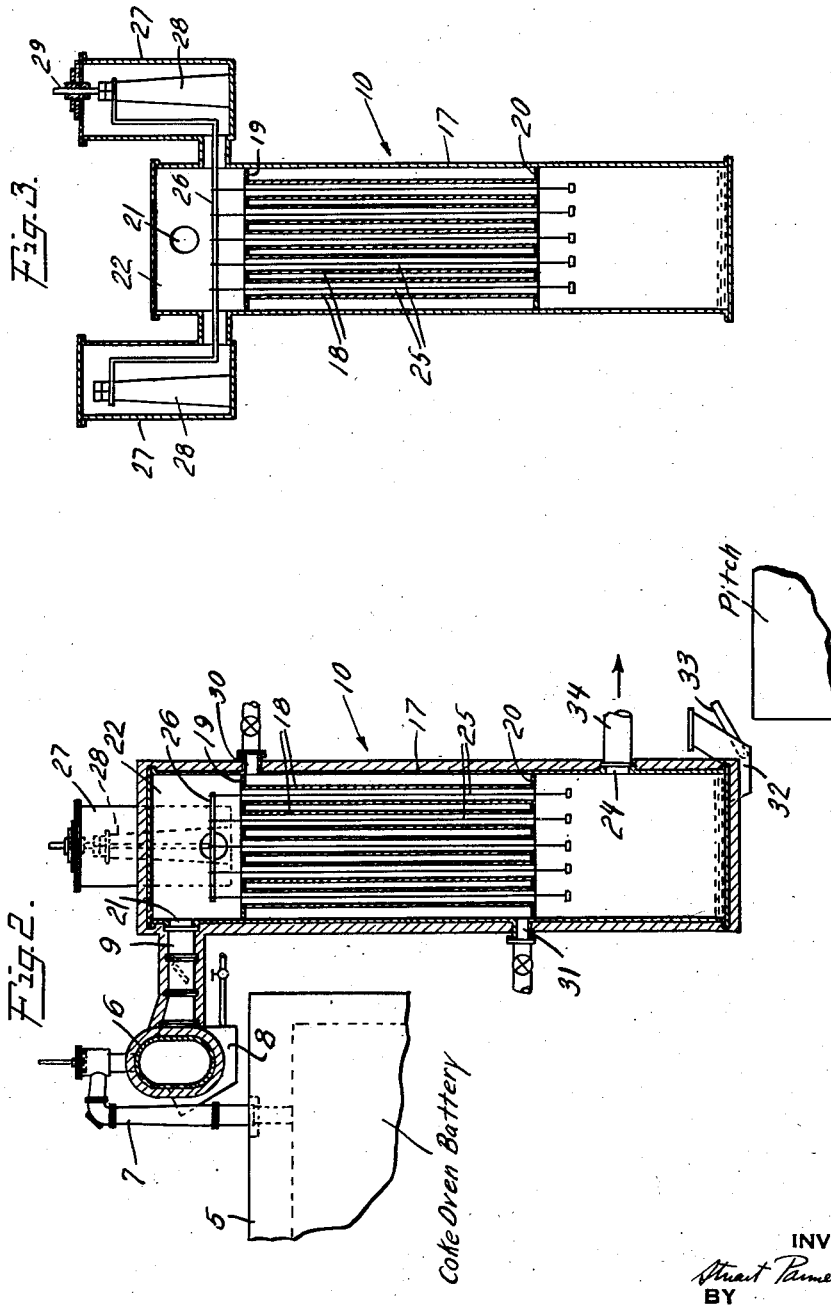
INVENTOR Jan. 31, 1933. S. P. MILLER 1,895,676
COAL DISTILLATION BY-PRODUCT RECOVERY SYSTEM
Filed June 18, 1929 3 Sheets-Sheet 3

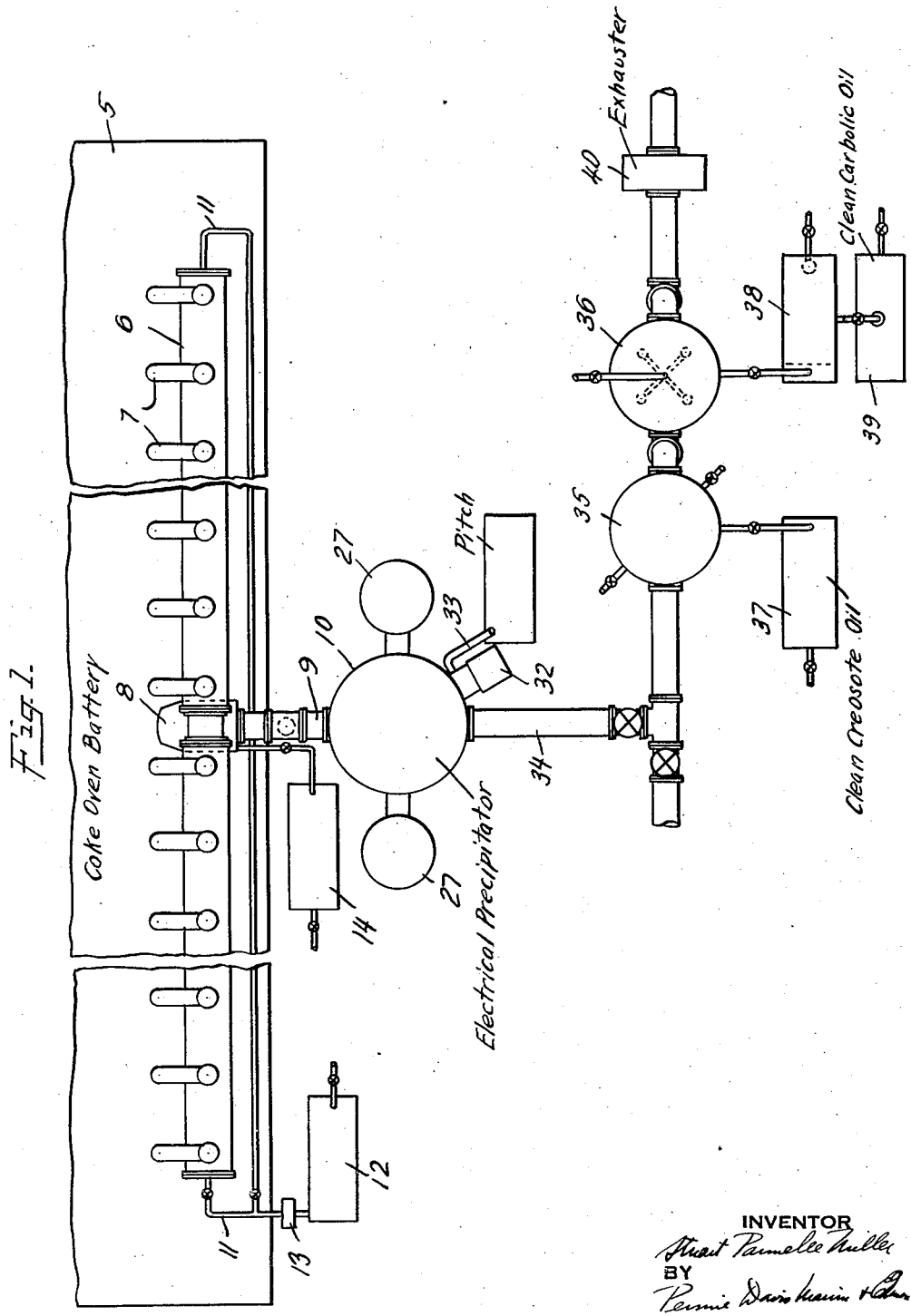

INVENTOR
Stuart Parmelee Miller
BY
Pennie Davis Marvin & Edmonds
ATTORNEYS

UNITED STATES PATENT OFFICE

STUART PARMELEE MILLER, OF ENGLEWOOD, NEW JERSEY, ASSIGNOR TO THE BARRETT COMPANY, OF NEW YORK, N. Y., A CORPORATION OF NEW JERSEY

COAL DISTILLATION BY-PRODUCT RECOVERY SYSTEM

Application filed June 18, 1929. Serial No. 371,931.

This invention relates to removing entrained matter, e. g. pitch particles from mixtures of gases, such as hot coal distillation gases, in an electrical precipitator at a high temperature and recovering clean condensate from the resulting clean gases and vapors. It includes both the method of removing the entrained impurities and apparatus for carrying it out.
The gases from a battery of coke ovens or retorts are ordinarily collected in a gas collector main where they are partially cooled, and from this main they are conveyed to condensing means where they are further cooled.
On cooling, tarry and pitchy constituents separate from the gases. The gas collector mains are flushed with a suitable liquid, e. g. ammonia liquor or tar or both, to prevent the accumulation of tar or pitch which may separate from the gases in these mains. If tar or pitch is allowed to accumulate in the main, it is distilled or decomposed by the hot gases passing through the main and is converted to hard pitch or coke which is difficult to remove from the main, and, which, if allowed to accumulate, may in time cause stoppage of the main.

This invention is not limited to the treatment of gases which have been passed through a collector main and which have been subjected to partial cooling in the collector main so as to separate tar or pitch from the gases, but relates to the cleaning of gases containing vapors, a portion of which have been condensed from the gases, and more particularly to the cleaning of the partially cooled gases in an electrical precipitator at a regulated temperature.

According to this invention the gases from a number of coke ovens, for example, are first partially cooled and then passed into the electrical precipitator. The gases are passed down through the precipitator and are subjected to an electrical discharge therein, which removes entrained matter from the gases. In order that higher boiling oils may, when desired, be recovered from the gases after cleaning, and be obtained directly from the gases as clean oils, the gases are, when desired, cleaned at a high temperature and the treatment to which the gases are subjected before entering the precipitator is then such as to allow the gases to enter the precipitator at a temperature at which matter removed from the gases in the precipitator, if allowed to remain in direct contact with the gases passing through the precipitator over a prolonged period of time would be distilled or decomposed by the action of the hot gases.

According to the usual operation of a coke oven battery, the gases from the ovens are collected in a collector main and the temperature of the gases is greatly reduced within the main. When operating according to this invention, if the gases are collected in a collector main before passing through the precipitator, they are cooled to only a regulated extent in the collector main to cause condensation of a sufficient quantity of oils of high boiling range to keep the precipitator tubes clean, and they enter the precipitator at an elevated temperature, still carrying oils of high boiling range in vapor form. In order to prevent the accumulation of pitch in the collector main, the bottom of the collector main may be flushed with tar, preferably hot tar or pitch. The gases may be subjected to limited spraying in the collector main to cause separation of sufficient condensate to insure adequate washing of the walls of the precipitator when the gases are subsequently passed down through the precipitator.

Regardless of whether the gases being cleaned in a precipitator pass up through the precipitator or down through the precipitator, the greater portion of the entrained matter is precipitated from the gases soon after they enter the discharge zone of the precipitator. As an illustration of this, it may be noted that in a precipitator of the Cottrell type containing vertical tubes ten feet in length, about 35% of the total entrained matter may separate from the gases in the first foot of the precipitator tubes and about 30% in the second foot, leaving only a relatively small proportion of the entrained matter precipitated in the remaining length of the tubes. When the gases to be treated are passed down through the tubes as contemplated by this invention, the greatest part of the entrained matter is precipitated from the gases near the top of the tubes, and in flowing down over the surfaces of the tubes prevents the accumulation of precipitated matter thereon. The invention contemplates treating the gases at a controlled temperature, high enough so that that matter precipitated from the gases would be distilled or decomposed unless removed from the precipitator tubes soon after it is deposited from the gases but low enough so that there is formed in the gases entering the precipitator a suspension of condensate sufficiently fluid at this high temperature and sufficient in amount to wash the walls of the precipitator as the condensate and other entrained matter is precipitated from the gases and to keep the walls of the precipitator clean. At such a temperature, hot coal distillation gases contain valuable oil constituents which after the cleaning operation can be recovered directly from the gases as clean oils, by cooling the cleaned gases. The invention contemplates obtaining this temperature by regulated cooling of the gases before they enter the precipitator.

Coke oven gases, for example, as they come from the ovens, contain fine particles of dust, coke, etc. On cooling the gases, the first condensate to separate out of the gases is a pitchy or resinous material, which is solid at ordinary temperatures in an isolated state. On further cooling, higher boiling oils, such as the highest boiling oils of the creosote range, separate from the gases, and on further cooling, creosote oils, carbolic oils, etc., separate. Owing to the entrained impurities carried from the ovens by the gases, the condensate obtained by cooling the gases is a tary or pitchy product instead of a clean distillate. By cleaning the gases in a precipitator at a high temperature, entrained impurities may be removed from the gases and clean condensate will be produced directly from such cleaned gases by cooling them. Acording to this invention, the gases are cleaned at a high temperature and the cleaning is carried out in a down-draft precipitator, after first partially cooling the gases.

An electrical precipitator of the Cottrell type may advantageously be employed for cleaning the gases. Such a precipitator comprises vertical tubes which serve as the collecting electrodes of the precipitator. The gases to be treated are passed through these tubes. Wires or rods which form the discharge electrodes are mounted approximately axially in the center of the collecting electrodes. The collecting electrodes are advantageously grounded and the discharge electrodes are connected with a source of unidirectional current. The voltage under which the process is operated is varied, depending upon the diameter of the precipitator tubes employed, the conductivity of the gas being treated, etc. Tubes with a diameter in the neighborhood of 6" are ordinarily employed with a voltage drop in the neighborhood of 35,000–50,000 volts.

According to this invention sufficient condensate, liquid at the cleaning temperature, is suspended in the gases entering the precipitator to insure washing the collecting electrodes with the matter precipitated from the gases. The gases are passed down through the precipitator and a large proportion of the suspended matter is precipitated from the gases at the top of the collecting electrodes. In flowing down over the electrodes, this condensate, precipitated out of the gases, washes the collecting electrodes and prevents the accumulation of tarry or pitchy constituents separated from the gases on these electrodes.

Instead of collecting the gases from a plurality of coke ovens or other coal distillation or coal carbonization units in a collector main and then subjecting them to electrical precipitation after regulated cooling in the collector main, the gases from one or more such units may pass directly into the top of the precipitator. Before entering the precipitator the gases are sprayed with a limited amount of a cooling medium such as water, or are otherwise cooled to separate condensate sufficient in amount and sufficiently fluid at the cleaning temperature to insure the formation of a fluid precipitate from the gases on the collecting electrodes such as to wash them and keep them free from pitchy deposits.

The gases from several sources as, for example, the gases from a number of coke ovens, may be combined and simultaneously treated in an electrical precipitator, or gases from a single source such as gases from a single unit, which may be a larger unit such as a water gas machine, may be separately treated. The invention relates to treating such gases at a high temperature and is particularly adapted to the cleaning of gases, which, on subsequent cooling, will yield desirable clean condensates.

In addition to the clean oil condensates, marketable pitches or pitches suitable for blending may be produced directly from the precipitator during the cleaning operation. The melting point of the pitch produced will depend upon the cooling to which the gases have been subjected prior to the cleaning operation. Coke oven gases, for example, may be cleaned at a temperature of 250° C. or 300° C. or higher. High melting point pitches may be obtained and on cooling the cleaned gases, valuable oils, including oils of higher boiling range, will be recovered directly from the gases.

The invention will be further described in connection with the accompanying drawings, although it is to be understood that the invention is not limited thereto.

Fig. 1 is a plan view of a coke oven battery equipped for carrying out the invention;

Fig. 2 is an elevation partly in section of a portion of the apparatus shown in Fig. 1;

Fig. 3 is a cross-section of the precipitator shown in Fig. 2; and

Figure 4:
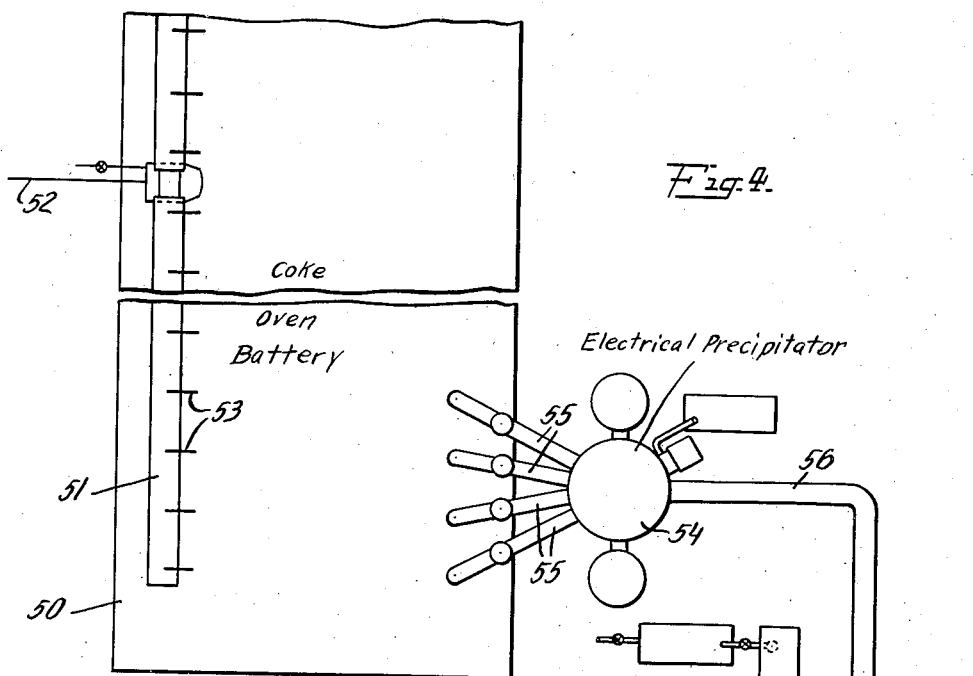
Figs. 4 and 5 show a modified form of apparatus in plan and in elevation.
Figure 5:
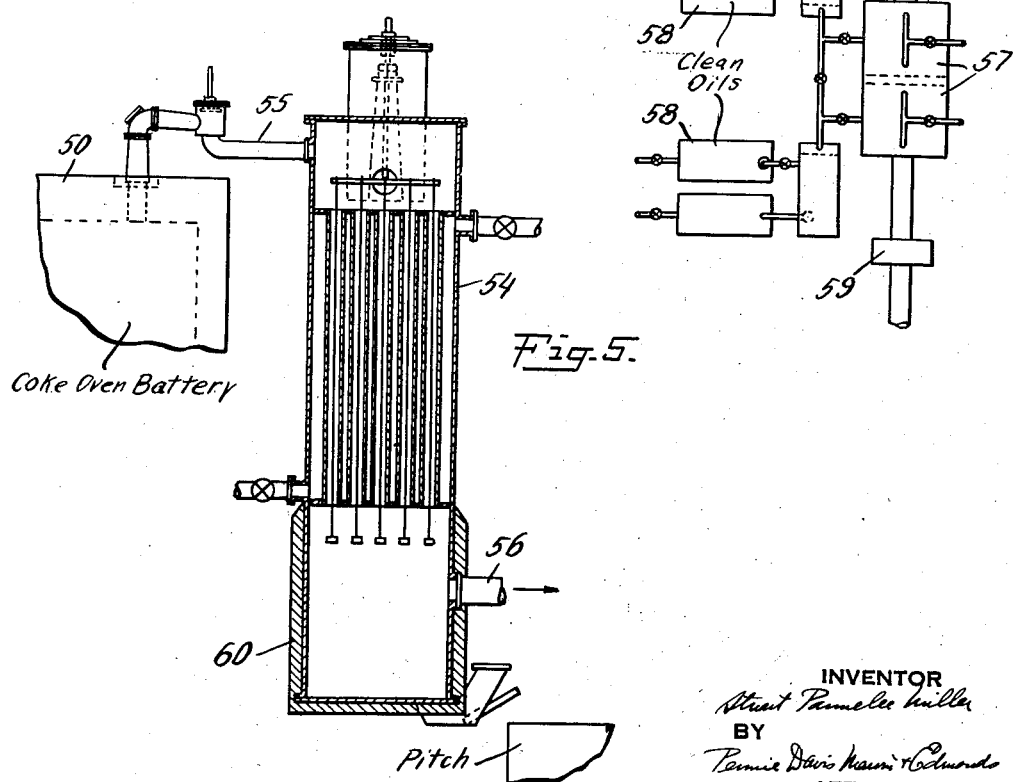

Referring to the drawings, 5 indicates a coke oven battery equipped with a gas collector main 6 which is connected with each of the ovens of the battery through an uptake pipe and goose-neck 7. The gases pass from the collector main through the center box 8 and the short main 9 into an electrical precipitator 10. In order that the gases shall enter the precipitator at a high temperature and in order to reduce the amount of condensable constituents removed from the gases before they enter the electrical precipitator, the cooling to which the gases are subjected in the collector main is limited. The drawings show pipes 11 supplied from the tank 12 by the pump 13 for supplying tar, which may be warm or hot tar or pitch, to each end of the collector main to prevent the accumulation of pitch in the bottom of the main. Means for subjecting the gases to limited spraying in the main may be provided. Tar or pitch comprising constituents removed from the gases as well as material used for flushing the bottom of the main is withdrawn from the center-box 8 into the tank 14. The tar or pitch collected in the tank 14 may be recirculated through the collector main, at least in part, or otherwise disposed of.

The electrical precipitator may in general be of any usual form of construction except that, according to this invention, it is necessary that the gases enter the top of the precipitator; they are subjected to cleaning by an electrical discharge as they pass down through the precipitator. The cleaned gases pass out from the bottom of the precipitator. Preferably, the precipitator is of the Cottrell type such as that shown in the drawings. This precipitator comprises a shell 17 enclosing a number of tubes 18 supported in heads 19 and 20 within the shell. The shell may be insulated against heat loss by the covering 17'. The inlet 21 above the tubes communicates with the chamber 22. The outlet 24 permits the escape of the gases from the precipitator after they have been cleaned.

A plurality of electrodes 25, preferably in the form of metal rods, weighted at their lower ends, extend through the tubes. They are supported by the bus-bar 26. The bus-bar extends into the casings 27 which enclose the insulators 28 upon which the bus-bar is supported. The high tension current employed for the cleaning of the gases is supplied to the bus-bar through the line 29. The casing 17 is grounded or otherwise connected to the source of current to complete the circuit. The casing and tubes form the positive electrode, the electrodes connected to the bus-bar being negative. The form and arrangement of the conductors in the circuit can be varied.

The cooling to which the gases are subjected prior to entering the precipitator is such that the gases entering the precipitator carry suspended in them particles of tarry or pitchy matter which is sufficiently fluid to run down the tubes of the precipitator and keep them clean. The gases are, nevertheless, at such a high temperature that if they were cleaned in an electrical precipitator in which the electrodes were not subjected to a washing action, entrained particles which would separate particularly at the upper ends of the tubes of the precipitator would remain in contact with the hot gases a sufficiently long period of time, to be distilled or decomposed to hard pitch or coke. If the gases were passed upwards through the precipitator, relatively little separation would occur on the upper portions of the tubes, and the washing effect on the upper portions would be negligible and coking of material deposited on the upper portion of the tubes would result.

In carrying out this invention the gases are passed downwards through the precipitator. The greater part of the entrained matter is separated from the gases in the top portion of the tubes. Only a small amount of entrained matter is separated from the gases in the lower portion of the tubes. The entrained matter separated in the upper portion of the tubes, on draining down through the tubes, washes from the tubes substantially all entrained matter separated thereon, including that separated on the lower portions. The cooling to which the gases are subjected before they enter the precipitator is so regulated that the gases carry sufficient entrained liquid particles to keep the tubes clean.

The tubes of the precipitator may be jacketed as shown and their temperature may be regulated by circulating a temperature-regulating medium through the jacket by means of the connections 30 and 31.

In order to prevent the accumulation of pitch which has been separated in the precipitator and distillation or coking of the pitch in that part of the bottom of the precipitator farthest from the drain, a body of the pitch may advantageously be maintained within the precipitator. By withdrawing the pitch from the precipitator through the coke trap 32 and levelling arm 33, any desired level of pitch may be maintained in the precipitator at all times. The position of the levelling arm determines the height to which the entrained matter is allowed to accumulate in the bottom of the precipitator. The cleaning of the gases is effected at a high temperature and the entrained matter therefore comprises chiefly pitchy constituents and is relatively free from lower boiling oils. The pitch which is drawn off through the levelling arm 33 may be collected and disposed of in any suitable manner.

The clean hot gases leaving the precipitator thru the opening 24 are passed thru the main 34 into any suitable type of condensing system. The condensing may be effected in a single step, or by fractional cooling of the gases several oil fractions may be obtained. The condensate obtained is a clean oil. It differs from the ordinary distillate in being free from decomposition products resulting from ordinary distillation methods and contains ingredients ordinarily decomposed by such methods. On cleaning at a high temperature, high boiling oils are carried over into the condensing system and an oil suitable for creosoting may be produced directly. By fractionally cooling the gases, a clean creosote oil and a clean carbolic oil may be produced. The carbolic oil may be directly extracted for tar acids.

The drawings show an indirect condenser 35 for removing a creosote oil fraction from the gases and a direct condenser 36 for removing a carbolic oil from the gases. The creosote oil is collected in a storage tank 37 and the carbolic oil, together with ammonia liquor, is drawn off into the decanter 38 and from there the carbolic oil is separately collected in the storage tank 39. An exhauster 40 is provided for drawing the gases through the system.

Instead of subjecting the gases to regulated cooling in a collector main, they may be collected from insulated uptake pipes in an insulated hot gas header. From this header they may be passed through means for subjecting them to partial cooling, such as sprays of water or ammonia liquor. The cooling is regulated so that the resulting gases carry with them sufficient suspended liquids to keep the tubes of the precipitator clean and yet the gases are at a sufficiently high temperature to retain desirable clean oil constituents in vapor form.

According to another method of operating, the gases from the individual ovens may be passed directly into the top of an electrical precipitator. Fig. 4 shows a coke oven battery 50 equipped in the usual way with a collector main 51 and cross-over main 52 which are shown more or less diagrammatically. Uptake pipes 53 connect the ovens with the collector main. A precipitator 54 is located at the rear of the battery. This precipitator is connected with the individual ovens through pipes 55. By proper manipulation of valves in the uptake pipes 53 and the pipes 55, the gases from the individual ovens may be directed either to the collector main 51 or the precipitator 54. The gases enter the top of the precipitator and are withdrawn from the bottom of the precipitator through the main 56. They are cooled in the condensing system 57 which is here shown as an ordinary direct condenser. The ammonia liquor and clean oils separating from the condenser may be collected in one or more decanters, depending upon whether a total condensate or fractional condensates are desired. From the decanters the clean oils are separately collected in suitable storage tanks indicated at 58. An exhauster 59 is shown for drawing the gases through the system.

The cooling of the gases between the time they leave the ovens and the time they enter the precipitator is preferably by means of ammonia liquor sprayed in regulated amount such that the gases carry with them sufficient particles of entrained liquid to wash the tubes of the precipitator and keep them clean. The gases, however, enter the precipitator at a sufficiently high temperature to carry vapors of high boiling constituents comprised therein. After cleaning these vapors are condensed and clean oil products are obtained. The limited cooling to which the gases are subjected before they enter the precipitator may be effected by spraying the gases in the pipes 55.

The precipitator may be insulated and especially the lower portion thereof as indicated at 60 in the drawings, to prevent condensation of clean oil products from the gases in the bottom of the precipitator, and blending of these clean oils with the pitchy constituents present in the bottom of the precipitator.

Although the invention is described more particularly as applied to the cleaning of coke oven gases, it is not limited thereto but may be used in connection with the operation of other coal distillation plants.

I claim:

1. In combination with a coal distillation plant, an electrical precipitator, means for collecting coal distillation gases from the plant and subjecting them to partial cooling, means for passing the collected gases into the the top of the precipitator, means within the precipitator for subjecting the gases passing therethrough to an electrical discharge, whereby the gases are cleaned, a condensing system for separating oils from the gases and means for withdrawing clean gases from the bottom of the precipitator and passing them to the condensing system.

2. In a coal distillation plant comprising a collecting main for collecting the gases from the ovens or retorts of the coal distillation plant, an electrical precipitator, means for connecting the main with the top of the precipitator, means for subjecting the gases to regulated partial cooling in passing from the ovens to the top of the precipitator, means within the precipitator for subjecting the gases to an electrical discharge, whereby entrained impurities are removed from the gases, a condensing system for separating oils from the gases and a main connecting the bottom of the precipitator with the condensing system.

3. In a coke oven plant comprising a plurality of coke ovens, an electrical precipitator, vertical tubes within the precipitator with discharge electrodes suspended therein, pipe means connecting the ovens with the precipitator above the top of the tubes, a condensing system for separating oils from the gases, a pipe connecting the condensing system with the precipitator below the bottom of the tubes, and means for subjecting the gases to regulated cooling in the pipe means connecting the ovens with the precipitator.

4. In a coke oven plant comprising a plurality of coke ovens, an electrical precipitator, pipes connecting the top of the precipitator with the individual ovens of the plant, means for partially cooling the gases as they pass through said pipes, a condensing system for separating oils from the gases and a gas main connecting the bottom of the precipitator with the condensing system.

In testimony whereof I affix my signature.

STUART PARMELEE MILLER.